US010237110B2

(12) United States Patent
Kim et al.

(10) Patent No.: US 10,237,110 B2
(45) Date of Patent: Mar. 19, 2019

(54) SYNCHRONIZATION METHOD AND APPARATUS IN MOBILE COMMUNICATION SYSTEM

(71) Applicant: Samsung Electronics Co., Ltd., Suwon-si, Gyeonggi-do (KR)

(72) Inventors: Chanhong Kim, Suwon-si (KR); Jiyun Seol, Seongnam-si (KR); Yeohun Yun, Hwaseong-si (KR); Kyeongyeon Kim, Hwaseong-si (KR); Jaeseung Son, Suwon-si (KR); Byunghwan Lee, Yongin-si (KR); Ming Hoka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/552,786

(22) PCT Filed: Feb. 24, 2016

(86) PCT No.: PCT/KR2016/001778
§ 371 (c)(1),
(2) Date: Aug. 22, 2017

(87) PCT Pub. No.: WO2016/137213
PCT Pub. Date: Sep. 1, 2016

(65) Prior Publication Data
US 2018/0109410 A1    Apr. 19, 2018

(30) Foreign Application Priority Data

Feb. 24, 2015  (KR) ........................ 10-2015-0025748

(51) Int. Cl.
*H04L 27/34* (2006.01)
*H04L 7/04* (2006.01)
(Continued)

(52) U.S. Cl.
CPC .......... *H04L 27/3455* (2013.01); *H04L 7/041* (2013.01); *H04L 27/264* (2013.01);
(Continued)

(58) Field of Classification Search
CPC ............. H04L 27/3455; H04L 27/2692; H04L 27/2663; H04L 7/041; H04L 27/264; H04L 27/2613; H04L 27/2671; H04L 2025/0342
See application file for complete search history.

(56) References Cited

U.S. PATENT DOCUMENTS 8,687,720 B2 *  4/2014  Berg ..................... H04L 25/022
                                          375/259
9,906,394 B2 *  2/2018  Chen .................... H04L 5/0053
(Continued)

FOREIGN PATENT DOCUMENTS

KR   10-2015-0145035 A   12/2015
WO      2014198346 A1    12/2014

OTHER PUBLICATIONS

Chung, Wonsuk, et al., "Synchronization Error in QAM-based FBMC System," IEEE Military Communications Conference, 2014, 9 pages.
(Continued)

*Primary Examiner* — Kenneth T Lam

(57) ABSTRACT

The present disclosure relates to a 5G or pre-5G communication system for supporting a higher data rate beyond a 4G communication system such as LTE. According to an embodiment of the present invention, a method for transmitting a synchronization signal by a base station in a filter bank multi carrier (FBMC) system and a base station using the same may be provided, the method comprising the steps of: generating a frequency-domain quadrature amplitude modulation (QAM) symbol sequence having a length of k for a synchronization signal; mapping the QAM symbol
(Continued)

sequence to a sub-carrier of a filter bank on the basis of the correlation characteristic of the synchronization signal; generating a quadrature amplitude modulation-filter bank multicarrier (QAM-FBMC) symbol including the synchronization signal on the basis of the mapping, and transmitting the generated QAM-FBMC symbol. In addition, a terminal communicating with the base station and an operation method for the terminal may be provided.

10 Claims, 12 Drawing Sheets

(51) Int. Cl.
H04L 27/26 (2006.01)
H04L 25/03 (2006.01)

(52) U.S. Cl.
CPC ...... *H04L 27/2613* (2013.01); *H04L 27/2663* (2013.01); *H04L 27/2692* (2013.01); *H04L 27/2671* (2013.01); *H04L 2025/0342* (2013.01)

(56) References Cited

U.S. PATENT DOCUMENTS

| | | | |
|---|---|---|---|
| 2012/0243625 A1 | 9/2012 | Berg | |
| 2013/0272448 A1 | 10/2013 | Moon et al. | |
| 2014/0192925 A1* | 7/2014 | Li | H04L 25/08 375/297 |
| 2015/0049836 A1* | 2/2015 | Li | H04L 5/0048 375/295 |
| 2015/0304146 A1* | 10/2015 | Yang | H04L 5/0066 370/329 |
| 2016/0007306 A1 | 1/2016 | Hong et al. | |
| 2016/0094377 A1* | 3/2016 | Chen | H04L 5/0053 370/350 |
| 2016/0099822 A1 | 4/2016 | Thein et al. | |
| 2017/0054586 A1* | 2/2017 | Lin | H04L 27/2613 |
| 2017/0099164 A1* | 4/2017 | Jiang | H04L 25/03 |
| 2017/0171010 A1* | 6/2017 | Qu | H04L 27/34 |

OTHER PUBLICATIONS

Mattera, Davide, et al., "Data-aided synchronization for OFDM/OQAM systems," Signal Processing 92 (2012) pp. 2284-2292.

ISA/KR, "International Search Report", Application No. PCT/KR2016/001778, Jul. 11, 2016, 3 pages.

* cited by examiner

SYNCHRONIZATION METHOD AND APPARATUS IN MOBILE COMMUNICATION SYSTEM

CROSS-REFERENCE TO RELATED APPLICATIONS AND CLAIM OF PRIORITY

This application is the National Stage of International Application No. PCT/KR2016/001778, filed Feb. 24, 2016, which claims the benefit of Korean Patent Application No. KR 10-2015-0025748, filed Feb. 24, 2015, the contents of which are incorporated herein by reference.

TECHNICAL FIELD

The present invention relates to a synchronization method and apparatus for a mobile communication system. Also, the present invention relates to an initial synchronization method and apparatus for use in a Filter Band Multi-Carrier-based (FBMC-based) cellular system.

BACKGROUND

In order to meet the increasing demand for wireless data traffic since the commercialization of 4G communication systems, the development focus is on the 5$^{th}$ Generation (5G) or pre-5G communication system. For this reason, the 5G or pre-5G communication system is called a beyond 4G network communication system or post Long Term Evolution (LTE) system.

Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive Multiple-Input Multiple Output (MIMO), Full Dimensional MIMO (FD-MIMO), array antenna, analog beamforming, and large scale antenna.

Also, in order to enhance network performance of the 5G communication system, developments are underway of various techniques such as evolved small cell, advanced small cell, cloud Radio Access Network (cloud RAN), ultra-dense network, Device to Device (D2D) communication, wireless backhaul, moving network, cooperative communication, Coordinated Multi-Points (CoMP), and interference cancellation.

Furthermore, the ongoing research includes the use of Hybrid Frequency Shift Keying (FSK) and Quadrature Amplitude Modulation (QAM)(FQAM) and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

In line with the recent explosive expansion of data traffic in wireless communication networks, demand is increasing for gigabit wireless communication technologies. In order to overcome the limit of data rate expansion based on frequency band expansion, the next generation (beyond 4G) mobile communication systems need to adopt a more-frequency-efficient multiple access technology than Cyclic Prefix-Orthogonal Frequency Division Multiplexing (CP-OFDM). For this reason, the FBMC technology operating without CP is attracting attention. The conventional FBMC technology is capable of improving frequency efficiency by obviating the need of guard band and CP with the use of per-subcarrier filters, in contrast with CP-OFDM technology, which essentially requires the guard band and CP. In particular, the conventional FBMC technology is characterized by the use of an Offset QAM (OQAM) rather than a QAM to guarantee orthogonality between time/frequency resources. That is, because the OQAM-FBMC guarantees orthogonality in the real domain but not in the complex domain, a signal propagating through a complex radio channel experiences intrinsic interference, resulting in difficulty in applying legacy channel estimation and MIMO techniques. Meanwhile, Filtered Multi-Tone (FMT) proposed as a QAM-based FBMC has not attracted much attention because its frequency efficiency is lower than that of CP-OFDM. However, new research published recently has demonstrated a novel QAM-FBMC, which is characterized by transmitting/receiving QAM symbols using a filter designed to cancel or minimize inter-QAM symbol interference with two or more base filters. That is, the OFDM and OQAM-FBMC are Single Pulse (=one prototype filter) Multi-Carrier (SP-MC) schemes, while the QAM-FBMC is a Multi-Pulse Multi-Carrier (MP-MC) scheme.

SUMMARY

Technical Problem

The present invention aims to provide an enhanced synchronization method and apparatus for use in a mobile communication system. Also, the present invention aims to provide an initial synchronization and cell checking method for use in an FBMC-based cellular system.

Solution to Problem

In accordance with an aspect of the present invention, a synchronization signal transmission method of a base station in a Filter Bank Multi-Carrier (FBMC) system includes generating a frequency domain Quadrature Amplitude Modulation (QAM) symbol sequence with a length of K for a synchronization signal, mapping the QAM symbol sequence to a subcarrier of a filter band based on a correlation characteristic of the synchronization signal, generating a QAM-FBMC symbol containing the synchronization signal based on the mapping, and transmitting the QAM-FBMC symbol.

In accordance with another aspect of the present invention, a base station of a Filter Bank Multi-Carrier (FBMC) system includes a communication unit which transmits and receives signals and a controller which controls generating a frequency domain Quadrature Amplitude Modulation (QAM) symbol sequence with a length of K for a synchronization signal, mapping the QAM symbol sequence to a subcarrier of a filter band based on a correlation characteristic of the synchronization signal, generating a QAM-FBMC symbol containing the synchronization signal based on the mapping, and transmitting the QAM-FBMC symbol.

In accordance with another aspect of the present invention, a synchronization method of a terminal in a Quadrature Amplitude Modulation (QAM) Filter Bank Multi-Carrier (FBMC) system includes storing sample values for QAM FBMC symbols, weighting the stored sample values, generating a sequence by summing the weighted sample values at a predetermined interval, and identifying synchronization information based on the sequence.

In accordance with still another aspect of the present invention, a terminal of a Quadrature Amplitude Modulation (QAM) Filter Bank Multi-Carrier (FBMC) system includes a communication unit which transmits and receives signals and a controller which controls storing sample values of QAM FBMC symbols, weighting the stored sample values, generating sequences by summing the weighted sample values at a predetermined interval, and identifying synchronization information based on the sequences.

Advantageous Effects of Invention

The synchronization method and apparatus of the present invention is advantageous in terms of facilitating synchronization in a mobile communication system.

Also, the synchronization signal generation method, the initial reception synchronization method, and the filter bank index-based system information acquisition method in a cell identification procedure according to the present invention are advantageous in terms of facilitating configuration of a QAM-FBMC-based cellular network.

DETAILED DESCRIPTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. The following description is made only of the parts necessary to help understand the operations according to various embodiments of the present invention, and a description is not made of other parts to avoid obscuring the subject matter of the present invention.

Figure 1:
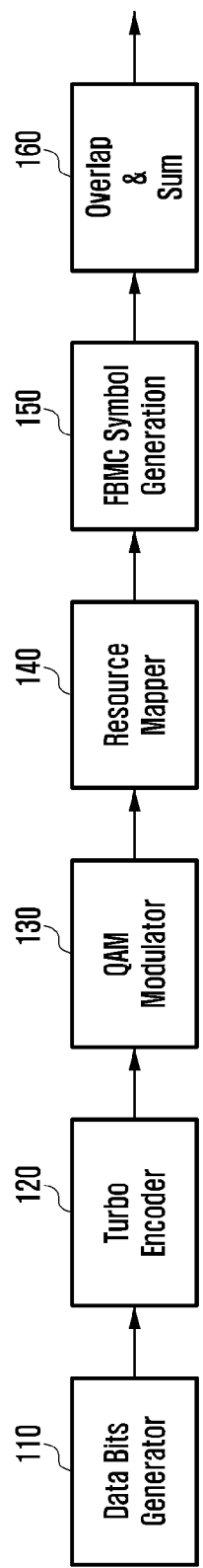
FIG. 1 is a diagram illustrating a configuration of a QAM-FBMC transmission system according to an embodiment of the present invention.

FIG. 1 is a diagram illustrating a configuration of a QAM-FBMC transmission system according to an embodiment of the present invention.

In reference to FIG. 1, the QAM-FBMC system 100 may include a data bits generator 110, a turbo encoder 120, a QAM modulator 130, a resource mapper 140, a symbol generator 150, and an overlap & sum module 160.

The data bits generator 110 generates data bits to be transmitted, the turbo encoder 120 performs channel encoding (turbo code), and the QAM modulator 130 performs a QAM modulation operation. These operations are performed in a similar way to that in the SP-MC systems such as legacy OFDM and OQAM-FBMC systems. However, this embodiment of the present invention differs from the OFDM and OQAM-FBMC systems in the operations of source allocation of the resource mapper 140, FBMC symbol generation of the symbol generator 150, and final transmission symbol generation of the overlap & sum module 160.

The QAM-FBMC system 100 may be a transmission device or a base station. The QAM-FBMC system 100 may also be a sub-device included in a transmission device or base station. The QAM-FBMC system 100 may be referred to as a controller of a transmission device or base station, or QAM-FBMC controller. Here, the controller or QAM-FBMC controller may perform the operations of the data bits generator 110, turbo encoder 120, QAM modulator 130, resource mapper 140, symbol generator 150, and overlap and sum module 160. The configuration of QAM-FBMC system 100 is not limited by the configuration of FIG. 1.

Figure 2:
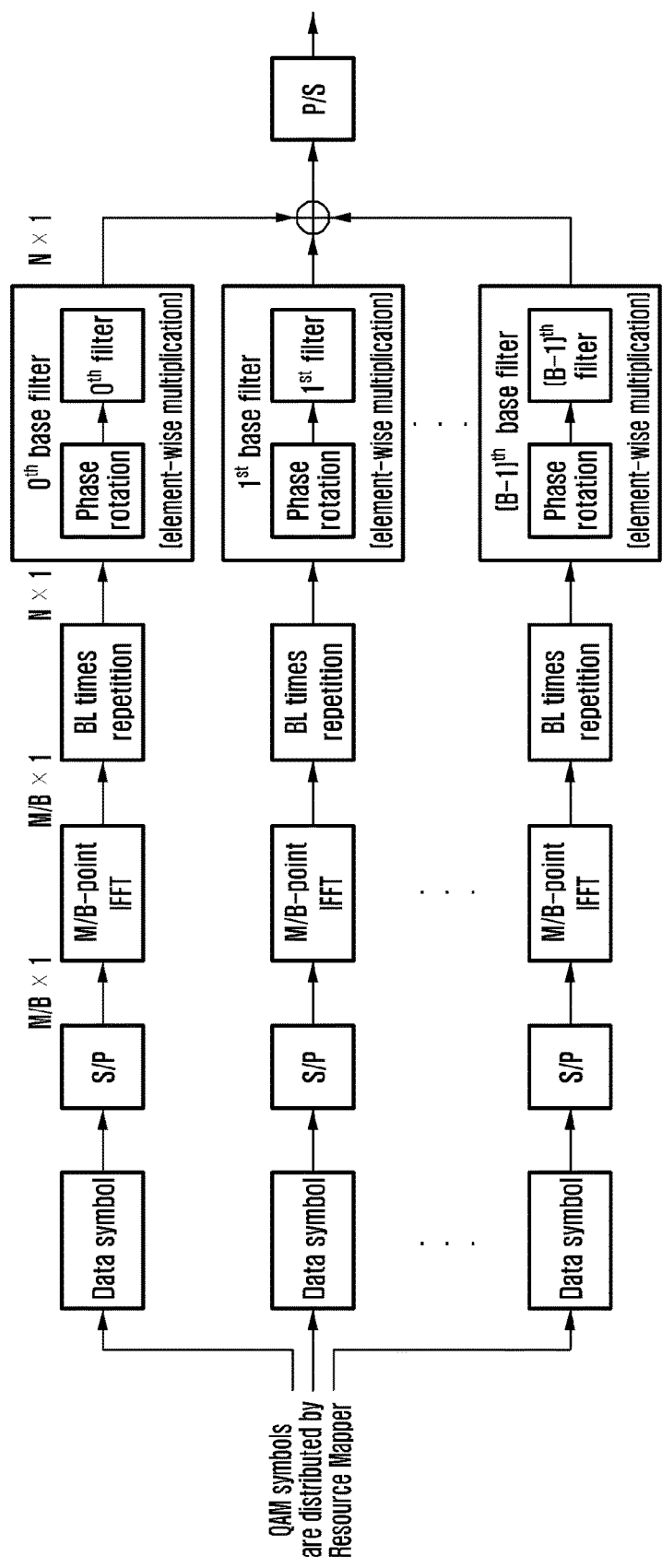
FIG. 2 is a diagram illustrating a configuration of a QAM-FBMC system for generating a symbol according to an embodiment of the present invention.

FIG. 2 is a diagram illustrating a configuration of a QAM-FBMC system for generating a symbol according to an embodiment of the present invention.

FIG. 2 shows an enlarged view of the symbol generator 150 of FIG. 1. That is, the drawing shows an enlarged view of a block for generating one QAM-FBMC symbol with the filter banks implemented in the time domain. Unlike the legacy OFDM system in which M QAM symbols are transformed to one OFDM symbol by means of an Inverse Fast Fourier Transform (IFFT), the QAM-FBMC system is characterized by sorting M QAM symbols into B groups of M/B symbols each, passing the QAM symbols groups through different filter banks (M/B-IFFT+BL iteration+phase rotation+filter coefficient multiplication), and summing them into one FBMC symbol. Here, the phase rotation may be omitted depending on the design of the base filters, and the QAM-FBMC symbol generation may be performed in a method different from that of FIG. 2 because the filter banks can be also implemented in the frequency domain.

Figure 3:
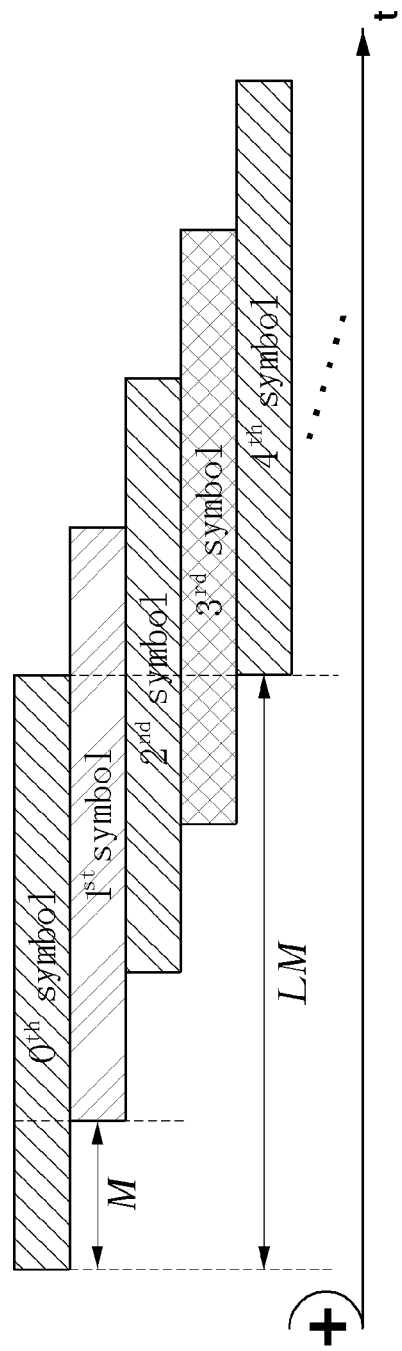
FIG. 3 is a diagram illustrating a method for performing an overlap and sum operation in a QAM system according to an embodiment of the present invention.

FIG. 3 is a diagram illustrating a method for performing an overlap & sum operation in a QAM system according to an embodiment of the present invention.

In reference to FIG. 3, the FBMC symbol generated through the procedure of FIG. 2 is shifted as much as M and then overlapped. Of course, it may also be possible to generate the QAM-FBMC symbol in another way. In FIG. 3, L denotes an overlapping factor of a natural number equal to or greater than 2. The overlapping factor may be changed depending on the filter design. In the embodiment of FIG. 3, L is set to 4. If L is 4, this means that four symbols are partially overlapped, and the four overlapped symbols are summed. A duration of LM may be equivalent to one sum duration. In the QAM-FBMC system, the signal generated by overlapping and summing the symbols is sent to a final analog front end.

This QAM-FBMC transmission method differs from the legacy OQAM-FBMC transmission method, which is characterized by mapping the Pulse Amplitude Modulation (PAM) signals to in-phase/quadrature phase signals alternately by time/frequency resource, shaping the signals with a single type filter for every subcarrier, and overlapping the signals as much as M/2 rather than M to increase the number of partially overlapped symbols. In QAM-FBMC, a plurality of QAM symbols are mapped to subcarriers to form one QAM-FBMC symbol with which (L−1) preceding symbols and (L−1) following symbols are partially overlapped. In OQAM-FBMC, a plurality of PAM symbols are mapped to subcarriers to form one OQAM-FBMC symbol with which (2L−1) preceding symbols and (2L−1) following symbols are partially mapped.

In a cellular communication system, a terminal has to acquire time synchronization and perform a cell search process based on a reference signal (RS) broadcast periodically by a base station in order to enter a cell. The OFDM-based cellular systems have matured through the commercialization of 4$^{th}$ Generation mobile communication services such as LTE and mobile WiMAX. However, the FBMC, which has mainly been researched as a technology for peer-to-peer communication such as Wi-Fi rather than cellular communication, is characterized by a preamble designed for packet-based transmission based on the RS transmitted by a transmitter for initial synchronization without consideration of overhead. Since the FBMC transmission should be performed in the state that the symbols are partially overlapped to secure the same data rate as that of the OFDM transmission, it is necessary to allow overlapping between the synchronization symbols and data symbols to avoid sacrificing spectral efficiency in comparison with the OFDM transmission, but so far there is neither any synchronization signal nor any reception synchronization algorithm designed in consideration thereof.

An embodiment of the present invention proposes a method for designing a synchronization signal and a reception synchronization algorithm that are capable of reducing overhead to implement an FBMC-based cellular system with a higher frequency efficiency compared with the CP-OFDM system and a cell identification method designed for QAM-FBMC.

In an embodiment of the present invention, three things are considered in designing the synchronization signal for an FBMC-based cellular system.

First, the overhead of synchronization symbols in the transmission resource should be equal to or similar to that of CP-OFDM. Unlike OFDM, FBMC is characterized in that consecutive symbols are partially overlapped as described with reference to FIG. 3; thus, the synchronization symbol should be designed in consideration of inter-data symbol interference. If overlap of the synchronization symbols with the data symbols is not allowed to avoid inter-symbol interference, the overhead increases significantly in comparison with OFDM; thus, any spectral efficiency gain achieved by removing the CP is decreased or nullified. For example, assuming that the length of an FBMC symbol is quadruple that of an OFDM symbol (L=4), it is necessary for the three symbols preceding a synchronization symbol and the three symbols following the synchronization symbol not to be used to avoid overlap of the synchronization symbol with any other symbol, which means that a duration of 7 OFDM symbols is used for synchronization.

Figure 4:
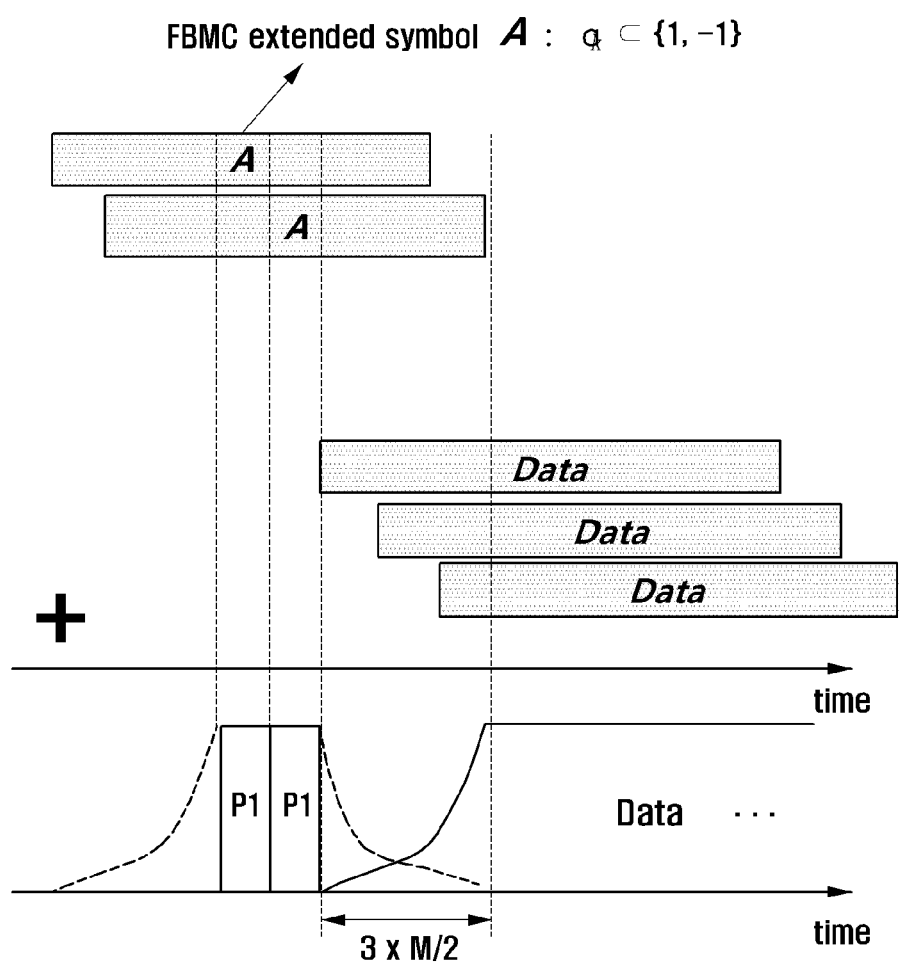
FIG. 4 is a diagram illustrating an FBMC synchronization preamble format.

FIG. 4 is a diagram illustrating a type of a synchronization preamble proposed by the PHYDYAS project of the EU as a representative FBMC project. The receiver consumes the time duration, which is L~2L times of one OFDM symbol length, to achieve the initial synchronization. This structure is not suitable for a cellular system in which a synchronization signal is transmitted periodically because of large overhead; therefore, there is a need of a symbol structure designed in consideration of overhead.

Second, the FBMC waveform should not be changed in designing the synchronization symbol. The FBMC waveform is designed to maintain orthogonality even when L consecutive symbols are overlapped; therefore, if only the synchronization symbol has a separate waveform, this increases the interference when overlapped with data symbols, which results in degradation of both the reception synchronization performance and data reception performance. This may also cause a difference from the legacy scheme in out-of-band spectrum emission of the corresponding waveform so as to nullify the comparative advantage over OFDM of FBMC capable of being acquired by removing the guard band in the channel band. However, an FBMC symbol is generated by iterating M/B-point IFFT on the data BL times per filter bank and multiplying the result by a predetermined filter coefficient in the time domain as shown in FIG. 2. In this case, because the IFFT sample values iterated BL times are multiplied by different filter coefficients, when applying a reception synchronization method such as delay correlation (mobile WiMAX) and cross correlation (LTE), a correlation peak is not shown prominently, it is difficult to apply the reception synchronization algorithm designed for use in the OFDM system without modification.

Third, since the FBMC is a multicarrier transmission technology like OFDM, it is necessary to design a sub-band type synchronization signal that is not dependent on the size of the operation band in the FBMC-based cellular system as in the OFDM-based system. For example, although LTE has various operation bandwidths of 1.4 MHz, 3 MHz, 5 MHz, 10 MHz, 15 MHz, and 20 MHz, the LTE synchronization signals, i.e., Primary Synchronization Signal (PSS) and Secondary Synchronization Signal (SSS), are mapped to the subcarriers in 6 Physical Resource Blocks (PRBs) around the Direct Current (DC) subcarrier or center frequency such that the synchronization symbols are designed in order for a terminal to acquire synchronization with a low sampling rate-based algorithm regardless of the size of the operation band of the base station.

An embodiment of the present invention proposes a synchronization method for use in an FBMC-based cellular system fulfilling at least one of the three aforementioned conditions and a FBMC-based cellular system synchronization method and apparatus capable of fulfilling all of the three aforementioned conditions.

In order to help understand the present invention, the relationship between the per-filter bank IFFT index of FIG. 2 and real physical subcarriers is defined as follows.

$$f_{b,m} = \frac{B}{M}m + \Delta f_b \left( 0 \leq \Delta f_b < \frac{B}{M} \right) \quad \text{[Definition 1]}$$

$f_{b,m}$: Baseband (i.e., digital) physical subcarrier frequency corresponding to $m^{th}$ IFFT index of $b^{th}$ filter bank R: number of base filters (≥2)

M: Total number of subcarriers of QAM-FBMC symbol including null subcarriers (this is equal to FFT/IFFT size of OFDM)

$M_b$: Maximum number of QAM symbols capable of being mapped in $b^{th}$ filter bank M/B)

$M_b^{vll}$: Number of nulling subcarriers in $b^{th}$ filter bank (including DC and guard subcarrier)

$$\left(M_b + M_b^{vll} = \frac{M}{B}\right)$$

$\Delta f_b$: Frequency domain frequency shift value corresponding to time domain phase rotation $$\left(0 \le \Delta f_b < \frac{B}{M},\right.$$

it may be changed depending on filter bank)

Each subcarrier QAM symbol is modulated in the form of $e^{j2\pi f_{b,m}t}$.

In QAM-FBMC, at least two (=B) filter bank base filter pairs (or sets) are designed to fulfil the Generalized Nyquist Condition and, at this time, the phase rotation value of each filter band may vary depending on the design of the base filter set. Accordingly, it may be possible that M IFFT indices and M physical subcarriers are mapped in a one-to-one relationship or not (e.g., when $\Delta f_b$=O).

Next, two different types of transmission end synchronization reference signal (RS) structures designed based on definition 1 are proposed according to an embodiment of the present invention. The synchronization RS structures correspond to two correlation types to be used in the proposed reception synchronization algorithm. In the following embodiment, a correlation scheme-based transmission end synchronization signal mapping method is proposed.

[RS 1] Cross-Correlation Type

A frequency domain symbol sequence with a length K $$\left(k \le \frac{M}{B}\right.$$

and typically but not mandatorily set to an even number for symmetry about center frequency) is expressed as S[k] (k=0, 1, ..., K−1) and mapped restrictively to the subcarriers of a specific filter band in the QAM-FBMC symbol periodically as shown in the following table. However, the synchronization RS period and filter bank index may vary depending on the system, but should be negotiated in advance between the transmitter and the receiver. Here, it is assumed that the determined filter bank index is 0, and this assumption does not lose generality.

An arbitrary QAM data symbol for information transmission is mapped to L−1 consecutive QAM-FBMC symbols before and after the QAM-FBMC symbol including the synchronization RS, and the overlap and sum process, i.e. overlap transmission, described with reference to FIG. 3 is allowed (it may be typical that the RS period is longer than L in terms of clarification of this operation and transmission overhead reduction).

Also, an arbitrary QAM data symbol may be mapped to the resources remaining available after mapping RS, i.e., part of sub-bands in the $0^{th}$ filter bank (non-RS mapping data subcarrier which may be partially nulled for performance improvement) and all data subcarriers in other filter banks except for the $0^{th}$ filter bank within the QAM-FBMC symbol carrying the synchronization RS. In this way, it is possible to adjust the RS resource overhead to an extent similar to that of CP-OFDM (LTE).

TABLE 1

| | IFFT index $m$ | | | | | | | | |
|---|---|---|---|---|---|---|---|---|---|
| | 0 | 1 | ... | $\frac{K}{2}-1$ | ... | $\frac{M}{B}-\frac{K}{2}$ | ... | $\frac{M}{B}-2$ | $\frac{M}{B}-1$ |
| RS $S[k]$ | $S\left[\frac{K}{2}\right]$ | $S\left[\frac{K}{2}+1\right]$ | ... | $S[K-1]$ | X | $S[0]$ | ... | $S\left[\frac{K}{2}-2\right]$ | $S\left[\frac{K}{2}-1\right]$ |

Table 1 shows a case where the DC subcarrier does not exist or when it is included at a resource allocation position although it exists.

TABLE 2

| | IFFT index $m$ | | | | | | | | |
|---|---|---|---|---|---|---|---|---|---|
| | 0 | 1 | ... | $\frac{K}{2}-1$ | $\frac{K}{2}$ | ... | $\frac{M}{B}-\frac{K}{2}$ | ... | $\frac{M}{B}-2$ | $\frac{M}{B}-1$ |
| RS $S[k]$ | X | $S\left[\frac{K}{2}\right]$ | ... | $S[K-2]$ | $S[K-1]$ | X | $S[0]$ | ... | $S\left[\frac{K}{2}-2\right]$ | $S\left[\frac{K}{2}-1\right]$ |

Table 2 shows a case where the DC subcarrier exists but it is excluded from a resource allocation position (assuming $\Delta f_o$=O, this is the case of corresponding to DC for m=O, it may be possible to extend to the case of DC for m≠O on the same principle).

In the case of applying the [RS 1] type to OQAM-FBMC, it may be possible to map the symbols to only 2k or 2k+1 physical subcarriers by limiting to 2-phase (+1, −1, or +j, −j).

[RS 2] Iterative Pattern-Based Delay-Correlation Type

A frequency domain symbol sequence with a length K $$\left( k \leq \frac{M}{B} \right.$$

and typically but not mandatorily set to an even number for symmetry about center frequency, and $$\frac{M}{B}$$

is typically set to a square of 2 for IFFT implementation efficiency) is expressed as S[k] (k=0, 1, . . . , K−1) and mapped restrictively to the even-numbered or odd-numbered subcarriers of a specific filter band in the QAM-FBMC symbol periodically as shown in the following table. However, the synchronization RS period and filter bank index may vary depending on the system, but they should be negotiated in advance between the transmitter and the receiver. Here, it is assumed that the determined filter bank index is 0, and this assumption does not lose generality.

An arbitrary QAM data symbol for information transmission is mapped to L−1 consecutive QAM-FBMC symbols before and after the QAM-FBMC symbol including the synchronization RS, and the overlap and sum process, i.e. overlap transmission, described with reference to FIG. 3 is allowed (it may be typical that the RS period is longer than L in terms of clarification of this operation and transmission overhead reduction).

Also, an arbitrary QAM data symbol may be mapped to all data subcarriers remaining after mapping RS in the QAM-FBMC symbol carrying the synchronization RS (this means that the subcarriers remaining after mapping the synchronization RS in the filter bank including the synchronization RS are all allocated 0, i.e., zero padding). In this way, it is possible to adjust the RS resource overhead to an extent similar to that of CP-OFDM (mobile WiMAX).

TABLE 3

| IFFT index $m$ | RS $S[k]$ |
|---|---|
| 0 | $S\left[\frac{K}{2}\right]$ |
| 1 | 0 |
| 2 | $S\left[\frac{K}{2}+1\right]$ |
| 3 | 0 |
| . | . |
| . | . |
| . | . |
| K − 2 | S[K − 1] |
| K − 1 | 0 |
| . | 0 |
| . | . |
| . | . |
| $\frac{M}{B} - K$ | S[0] |
| $\frac{M}{B} - K + 1$ | 0 |
| $\frac{M}{B} - K + 2$ | S[1] |
| $\frac{M}{B} - K + 3$ | 0 |
| . | . |
| . | . |
| . | . |
| $\frac{M}{B} - 2$ | $S\left[\frac{K}{2}-1\right]$ |
| $\frac{M}{B} - 1$ | 0 |

Table 3 shows a case of mapping the symbol sequence to the even-numbered index when the DC subcarrier is not in an even-numbered index or, although having the even-numbered index, is included as a resource allocation position (this may be extended to an example of mapping it to an odd-numbered index on the same principle).

TABLE 4

| IFFT index $m$ | RS $S[k]$ |
|---|---|
| 0 | 0 |
| 1 | 0 |
| 2 | $S\left[\frac{K}{2}\right]$ |
| 3 | 0 |
| 4 | $S\left[\frac{K}{2}+1\right]$ |
| . | . |
| . | . |
| . | . |
| K − 2 | S[K − 2] |
| K − 1 | 0 |
| K | S[K − 1] |
| . | 0 |
| . | . |
| . | . |
| $\frac{M}{B} - K$ | S[0] |
| $\frac{M}{B} - K + 1$ | 0 |
| $\frac{M}{B} - K + 2$ | S[1] |
| $\frac{M}{B} - K + 3$ | 0 |
| . | . |
| . | . |
| . | . |

TABLE 4-continued

| IFFT index $m$ | RS $^{S[k]}$ |
|---|---|
| . | . |
| $\frac{M}{B} - 2$ | $S\left[\frac{K}{2} - 1\right]$ |
| $\frac{M}{B} - 1$ | 0 |

Table 4 shows a case of mapping the symbol sequence to an even-numbered index by excluding from the resource position of the DC subcarrier is in a an even-numbered index (this may be extended to an example of mapping it to an odd-numbered index on the same principle).

In the case of applying [RS 1] to OQAM-FBMC, it may be possible to sort the physical subcarriers into 4 groups (4k, 4k+1, 4k+2, and 4k+3) and map the symbol to one of the groups.

Figure 5:
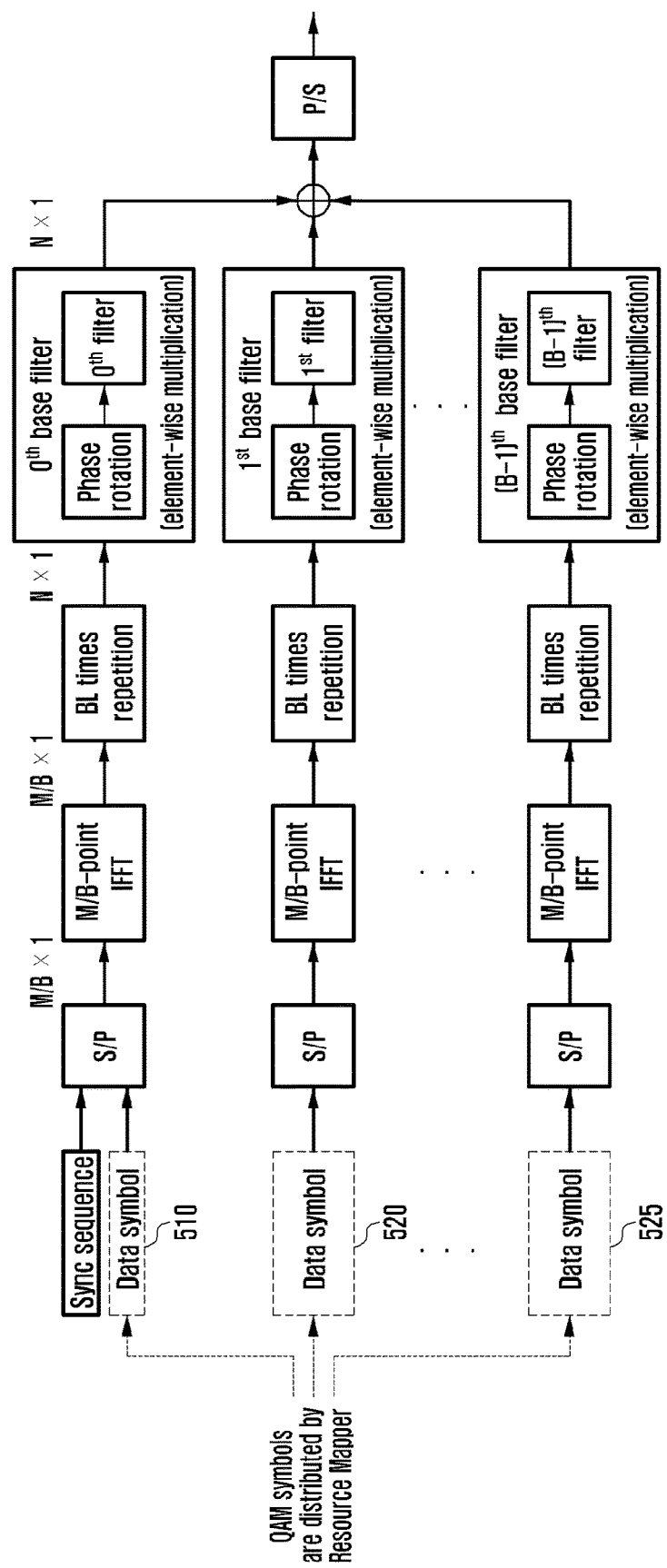
FIG. 5 is a diagram illustrating a procedure for generating a QAM-FBMC symbol with the use of different synchronization sequences according to an embodiment of the present invention.

FIG. 5 is a diagram illustrating a procedure for generating a QAM-FBMC symbol with the use of different synchronization sequences according to an embodiment of the present invention.

In reference to FIG. 5, assuming that the synchronization sequence period is P symbols, every $P^{th}$ symbol is generated through the process of FIG. 5. Other P−1 symbols may be generated through the process of FIG. 2. A symbol including the synchronization sequence may be configured differently depending on how one of two options is selected as follows (It is assumed that the synchronization sequence is mapped to the $0^{th}$ filter bank in the following options).

Option 1: When the synchronization sequence is mapped to the $0^{th}$ filter bank, the data are mapped to the remaining resource region of the $0^{th}$ filter bank or not.

Option 2: When the synchronization sequence is mapped to the $0^{th}$ filter bank, the data are mapped to the resource regions of non-$0^{th}$ filter banks or not.

If the synchronization symbol is a type of preamble including no data, this is the case of not transmitting data in option 1. That is, the block 510 is nulled in FIG. 5. If the synchronization sequence is transmitted in the form of a sub-band similar to that of the LTE system, it may be possible to map the data to the residual resource region (i.e., a resource mapper allocates resources to block 510 of FIG. 5) or reserve the resource region for other purposes in option 1.

In the case of option 2, since the QAM-FBMC system maintains orthogonality between filter banks (base filters), it is usual to allow data symbol transmission. That is, the resource mapper may allocate resources to blocks 520 and 525 of FIG. 5. Depending on the case, it may also be possible not to transmit data symbols for improvement of reception synchronization performance of the terminal. It may also be possible to regard option 2 as a synchronization symbol configuration method considerable only in QAM-FBMC.

Figure 6:
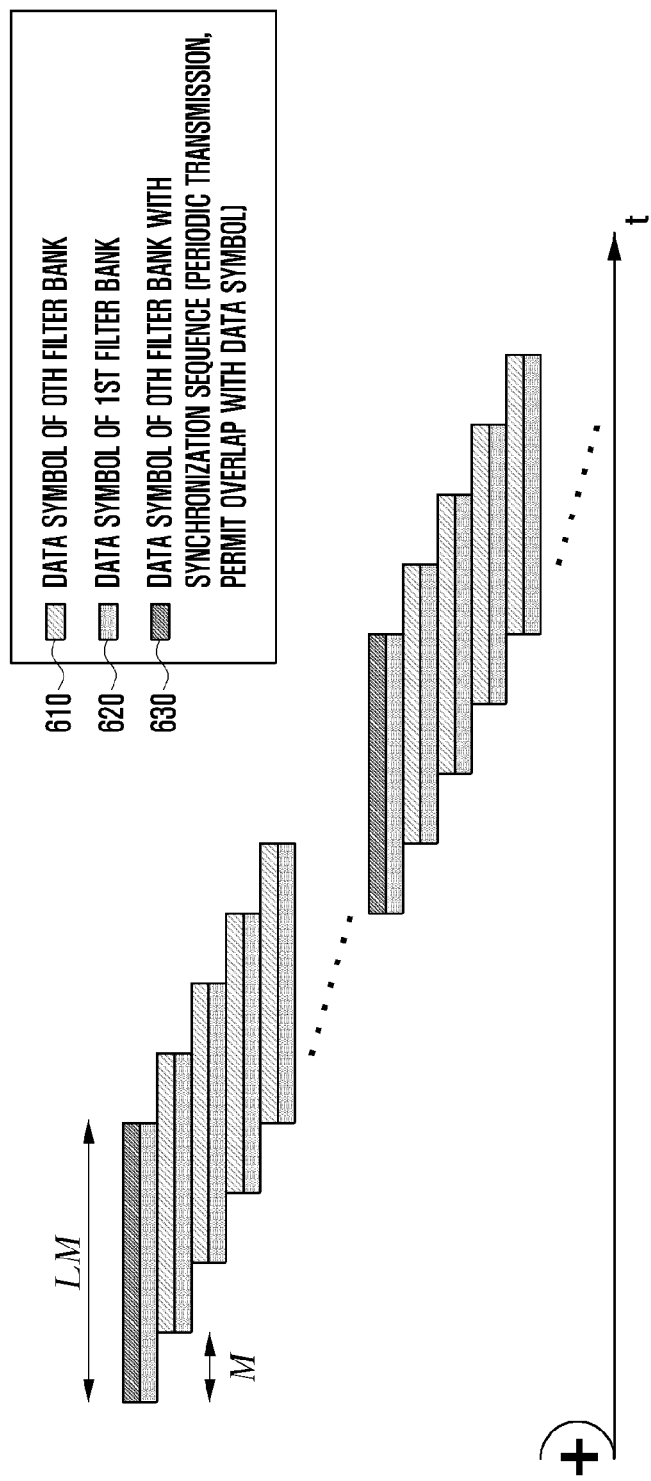
FIG. 6 is a diagram illustrating a synchronization symbol transmission pattern in a QAM-FBMC system according to an embodiment of the present invention.

FIG. 6 is a diagram illustrating a synchronization symbol transmission pattern in a QAM-FBMC system according to an embodiment of the present invention.

In reference to FIG. 6, the synchronization symbol generated through the procedure described with reference to FIGS. 2 to 5 is transmitted in the state of being overlapped with data symbols. That is, FIG. 6 is provided for explaining the overlap and sum process of FIG. 3 along with the symbol generation process of FIGS. 2 and 5. FIG. 6 is directed to an exemplary case where the number of filter banks is 2 (B=2). FIG. 6 depicts a situation where a system with two filter banks transmits a symbol 630 containing the synchronization sequence periodically by means of the $0^{th}$ filter bank. The symbol 630 containing the synchronization sequence is transmitted periodically through the $0^{th}$ filter bank in the state of being overlapped with the preceding and following data symbols 610 of the $0^{th}$ filter bank and the data symbols 620 of the $1^{st}$ filter bank.

Next, a description is made of the reception synchronization method according to an embodiment of the present invention. A receiver may generate a baseband complex signal at a sampling rate agreed with a transmitter through a Radio Frequency (RF) process and an Analog-to-Digital Conversion (ADC) process. If the synchronization sequence is transmitted in the form of a sub-band similar to that of the LTE system, it may be possible to perform a synchronization process after down-sampling to see only the band region.

Figure 7:
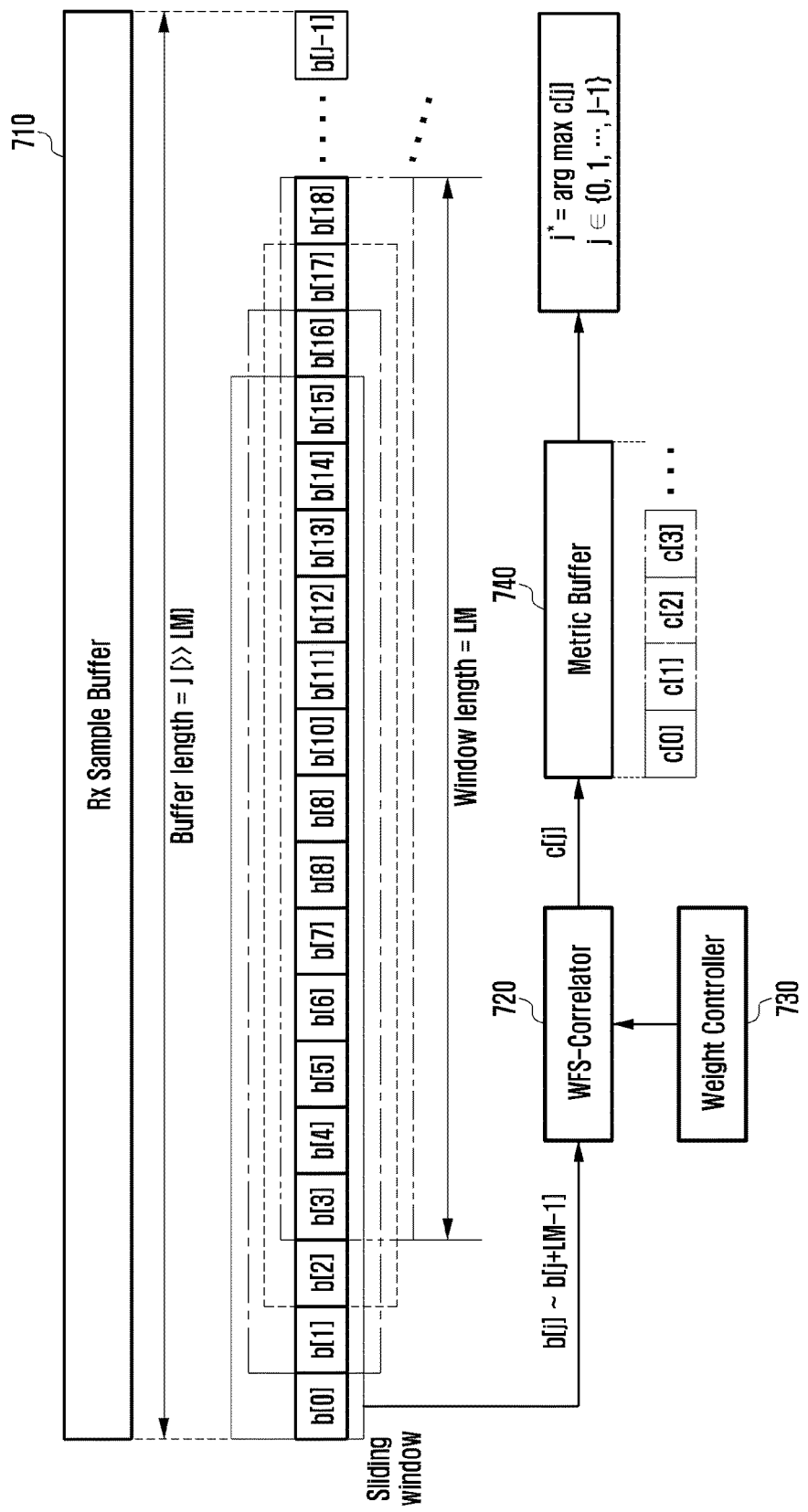
FIG. 7 is a diagram illustrating a configuration of a reception device for acquiring initial synchronization and signal flows according to an embodiment of the present invention.

FIG. 7 is a diagram illustrating a configuration of a reception device for acquiring initial synchronization and signal flows according to an embodiment of the present invention. The reception device may be a terminal. Although the descriptions are made of components constituting the reception device configured as shown in FIG. 7, the reception device of the present invention is not limited to that configuration. The reception device may include a communication unit for receiving the synchronization signal and a synchronization controller.

In reference to FIG. 7, the reception device may include a receive (RX) sample buffer 710, a Weighting-Folding-Sum (WFS) correlator 720, a weight controller 730, and a metric buffer 740. The weight controller 730 may control the WFS correlator 720 to operate as follows. The weight controller 730 may be omitted and, in this case, the WFS correlator 720 may take charge of the corresponding functions. The metric buffer 740 may store c[j]c[j] values generated through a series of processes.

FIG. 7 depicts an initial time synchronization acquisition procedure of a receiver. The received baseband complex signal is first buffered in the buffer 710 having a length of J. That is, the signal is stored in the sample buffer. Assuming that J is equivalent to the system sampling rate, it may be possible to process the sample values corresponding to a number of symbols equal to or greater than the synchronization symbol period of P. Typically, since the QAM-FBMC symbol length is LM (L is the overlapping factor, and M is the number of QAM symbols), J is likely to be greater than LM. The sampling rate may become J=PLM for the case of storing all samples during one period and J=nPLM for the case of storing the samples during a longer period. Next, the LM sample values are input to the WFS correlator 720 proposed in the present invention in series in a sliding window manner.

Figure 8:
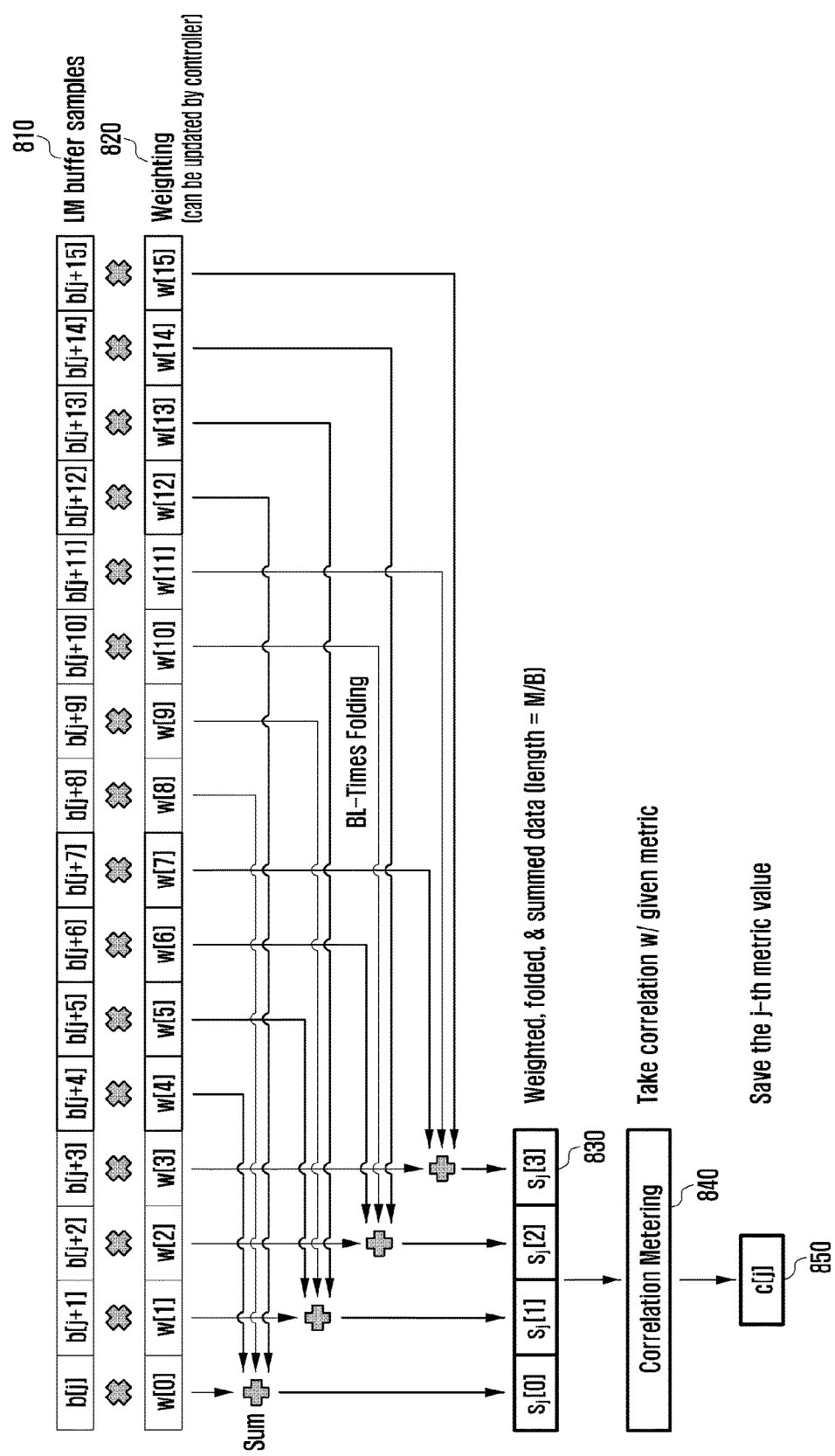
FIG. 8 is a diagram illustrating signal flows in a WFS correlator according to an embodiment of the present invention.

A description is made of the method for processing the input to the WFS correlator 720 with reference to FIG. 8.

FIG. 8 is a diagram illustrating signal flows in a WFS correlator according to an embodiment of the present invention. The embodiment of FIG. 8 is directed to an exemplary case where the number of filter banks B=2, the overlapping factor L=2, and the number of QAM symbols M=8. The weighting to be applied may be calculated based on various metrics such as Signal-to-Noise Ratio (SNR), Signal-to-Interference Ratio (SIR), and Signal-to-Interference plus Noise Ratio (SINR).

FIG. 8 depicts signal flows in the WFS correlator 720 generating the output c[j] 850 when the LM buffer samples 810 starting from the $j^{th}$ sample are input.

The input values b[j+i] (i=0, 1, ..., LM−1) 810 are multiplied by a weighting factor w[i], and BL result values taken at an interval of M/B (interval of 4 in the embodiment of FIG. 8) are added to generate the complex sequence 830, $s_j[n]$ (n=, 0, 1, ..., M/B−1), with a length of M/B. This can be expressed as an equation as follows:

$$s_j[n] = \sum_{l=0}^{BL-1} b\left[j+n+\frac{M}{B}l\right]w\left[n+\frac{M}{B}l\right] \qquad \text{[Equation 1]}$$

Then, it may be possible to calculate the correlation metric value c[j] given based on the complex sequence $s_j[n]$. Many sequence correlation schemes are known mathematically. In the legacy OFDM-based cellular systems, a cross-correlation method (LTE) and a delay-correlation (mobile WiMAX) method are used. In the present invention, the correlation metrics may be defined diversely depending on the sequence type as follows.

[RS 1] for Cross-Correlation Reception Type $$c[j] = \sum_{n=0}^{M/B-1} s_j[n]s*[n] \qquad \text{[Equation 2]}$$

Here, s[n] denotes a time domain synchronization sequence acquired by performing IFFT on the synchronization RS S[k] as described with reference to Tables 1 and 2.

[RS 2] for Iterative Pattern-Based Delay-Correlation Reception Type $$c[j] = \frac{\left|\sum_{n=0}^{M/2B-1} s_j[n]s_j^*\left[n+\frac{M}{2B}\right]\right|^2}{\left(\sum_{n=0}^{M/2B-1} |s_j[n]|^2\right)^2} \qquad \text{[Equation 3]}$$

Equations 2 and 3 are types of equations appearing in the conventional literature about OFDM and sequence technologies. In the conventional literature, the receive signal b[j] itself is used rather than the $s_j[n]$ value. However, the present invention is characterized in that the Weighted, Folded, and Summed (SFS) $s_j[n]$ calculated based on equation 1 is used instead of the b[j] value.

The c[j] values calculated through the above process are buffered in the metric buffer 740 as shown in FIG. 7. The index j* having the largest of the values is determined as the start point of the synchronization RS. The subsequent operations such as frequency offset compensation and channel estimation are similar to those of the legacy OFDM cellular system terminal; thus, detailed descriptions thereof are omitted herein.

In order to make it possible for a terminal that initially enters a cellular network or wakes up from a sleep mode (or idle mode) for data communication to re-attach to the cellular network, there is a need of a method for assigning cell IDs to the base stations and allowing the UE to acquire a cell ID. The legacy cellular networks operate with a few hundred cell IDs (504 cell IDs in LTE) and there is a need of a cell ID configuration method for efficient cell search.

In the QAM-FBMC system, at least two filter banks are used, and the information on the filter banks and corresponding indices are shared between the transmitter and the receiver. An embodiment of the present invention proposes a method for a terminal to acquire the information (such as Physical Identifier (PHY ID), Cell Group ID, TDD(time division duplex)/FDD(frequency division duplex) indicator, and frame start and end notification) that should be acquired in the cell identification procedure before receiving any system information from the base station implicitly in the course of achieving initial synchronization by creating an intrinsic rule with at least one filter bank index. An embodiment of the present invention may also propose a method capable of using the characteristic in which the synchronization signal is mapped only in a predetermined filter bank. In order to use the intrinsic rule based on the filter bank indices between the terminal and the base station, the intrinsic rule should be configured in advance to the base station and the terminal.

[Cell ID Configuration Method for Cell Search]

1. Physical Layer (PHY) ID Mapping Method

1-A (sequence-based): Map sequences with good auto-correlation and cross-correlation characteristics to the same resource of a common filter bank (e.g., Zadoff-Chu 3 root sequence is used for the $0^{th}$ filter bank resource)

1-B (frequency-based): Shift physical subcarrier position of a common filter bank with one sequence (e.g., 3k/3k+ ⅓k+2)

1-C (filter-based, QAM-FBMC only): Map one sequence to B common base filters (e.g., sectoring into 3 sectors with B (=3) base filters)

1-D (using both the sequence and filter, QAM-FBMC only): Map B sequences to B common base filters in one-to-one manner 2. Cell Group ID Mapping Method: Sequence+Frequency/Filter Mix 2-A (sequence only): Map different sequences to the same resource of a common filter bank (e.g., 168 SSSs of LTE)

2-B (sequence+Freq.): Shift physical subcarrier position of a common filter bank to generate multiple groups and distinguish between the sequences in each group (e.g., SA-Preamble of 802.16m)

2-C (Sequence+Base filter, QAM-FBMC only): Group sequences by base filter and distinguish between sequences in each base filter The transmission end synchronization signal of the initial time synchronization method proposed in an embodiment of the present invention may be generated in association with the PHY ID configuration method; thus, the terminal can acquire a PHY ID of the corresponding base station implicitly upon achieving initial time synchronization (because the synchronization signal configuration schemes or transmission patterns match the PHY IDs in a one-to-one manner, one of 1-A, 1-B, 1-C, and 1-D methods is selected for exclusive use). In the case of the 1-A method, three different Zadoff-Chu root sequences are mapped to different PHY IDs in a one-to-one manner, a base station is assigned one of the three PHY IDs and transmits the corresponding sequence through the resource of the $0^{th}$ filter bank, and a terminal applies the WFS-correlation with the three root sequences to achieve synchronization with index j* of the sequence with the highest value and retrieves the Cell group ID corresponding to the base station with the corresponding sequence (PHY ID) to attempt attaching to the base station (likewise, one of the 2-A, 2-B, and 2-C methods is selected for exclusive use).

[TDD/FDD Discrimination Method]

It may be possible to assign a synchronization signal exclusively to a specific filter bank per duplex mode. For example, a terminal determines the duplex mode as FDD in the case of detecting a synchronization signal at the $0^{th}$ filter bank or TDD in the case of detecting the synchronization signal at the $1^{st}$ filter bank. The base station transmits the synchronization signal through the $0^{th}$ filter bank in FDD or the $1^{st}$ filter band in TDD. The indices and number of filter banks are not limited by the above embodiment, and other types of filter bank indices and more filter banks can be used.

[Frame Synchronization Method]

It may be possible to assign the synchronization signals indicating the start and end of a frame to the resources in different filter banks. For example, the terminal is aware of the start of a frame upon detection of the synchronization signal at the $0^{th}$ filter bank and the end of the frame upon detection of the synchronization signal at the $1^{st}$ filter bank. The base station transmits the synchronization signal through the $0^{th}$ filter bank to indicate the start of the frame and through the $1^{st}$ filter bank to indicate the end of the frame. The indices and number of filter banks are not limited by the above embodiment, and other types of filter bank indices and more filter banks can be used.

Figure 9:
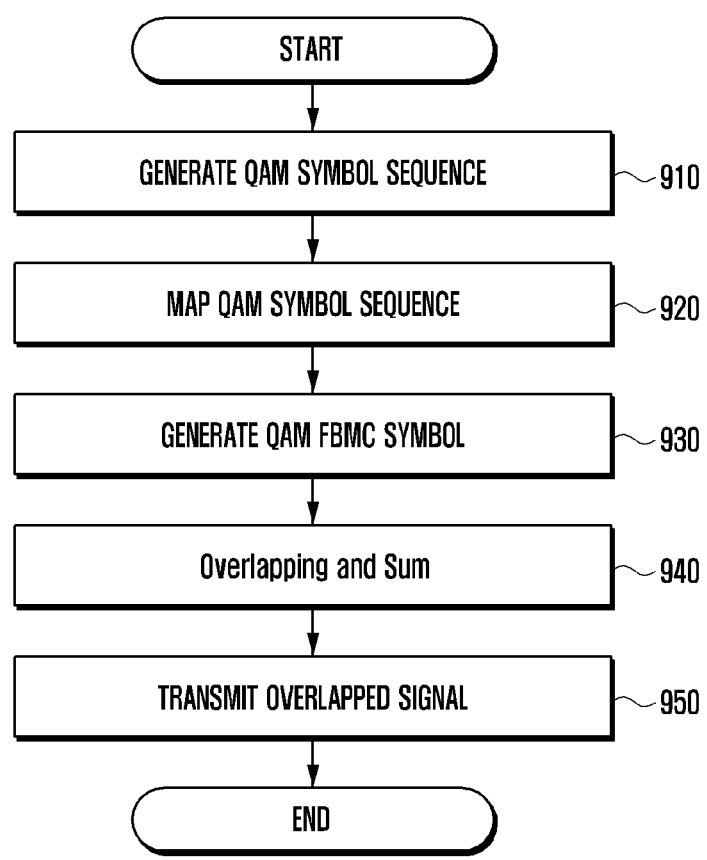
FIG. 9 is a flowchart illustrating a method for generating and transmitting a QAM FBMC symbol according to an embodiment of the present invention.

FIG. 9 is a flowchart illustrating a method for generating and transmitting a QAM FBMC symbol according to an embodiment of the present invention.

The base station generates a frequency domain QAM symbol sequence at step 910 with a length of K for a synchronization signal. The base station may generate a data symbol containing no synchronization signal.

The base station maps the QAM symbol sequence to a subcarrier of a filter bank at step 920 based on the correlation characteristic of the synchronization signal. For example, in the case of the cross correlation-based synchronization signal, the QAM symbol sequence is mapped to the subcarrier of a predetermined filter bank among a plurality of filter banks. In the case of the delay correlation-based synchronization signal, the QAM symbol sequence may be mapped to one of odd-numbered subcarrier groups or even-numbered subcarrier groups of a predetermined filter bank among the plural filter banks. It may be possible to map 0 to the subcarriers to which no QAM symbol sequence is mapped in the predetermined filter bank. In detail, the [RS 1] generation method and [RS 2] generation method are referred in an embodiment of the present invention for performing the mapping method.

It may be possible to map the QAM symbol sequence in order to identify at least one system information of a physical identifier, a cell group identifier, a TDD/FDD identifier, and a frame identifier, based on the filter bank index. For more details about the method, refer to [Cell ID configuration method for cell search], [TDD/FDD discrimination method], and [Frame synchronization method] described in the embodiments of the present invention.

In an embodiment of the present invention, the synchronization signal transmission method may be limited to the method of FIG. 9 and performed according to the embodiments of FIGS. 1 to 8 and other alternative embodiments modified therefrom.

Figure 10:
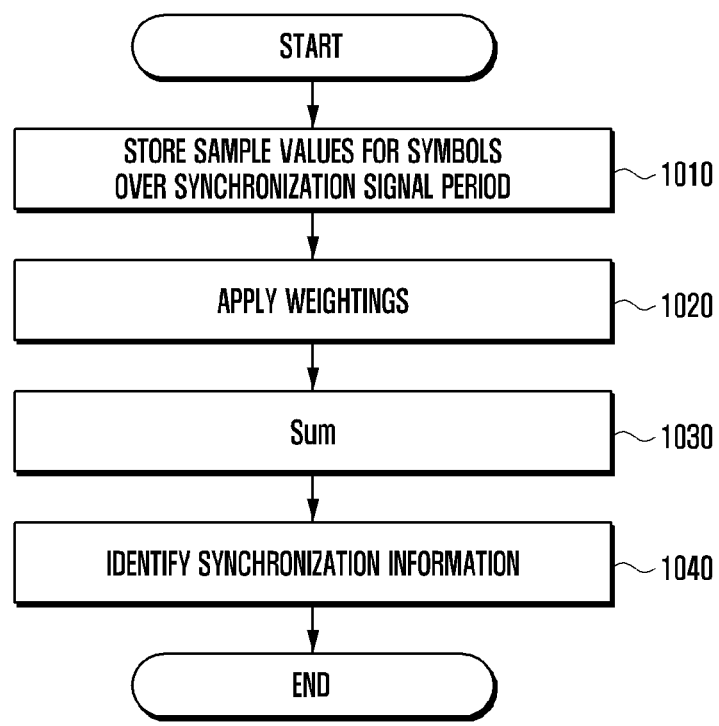
FIG. 10 is a flowchart illustrating a synchronization method of an FBMC terminal according to an embodiment of the present invention.

FIG. 10 is a flowchart illustrating a synchronization method of an FBMC terminal according to an embodiment of the present invention.

In reference to FIG. 10, the terminal receives QAM-FBMC symbols and stores sample values of the received symbols at step 1010. For more detail about symbol reception and sample value storage operations, refer to FIG. 7 and the description made with reference to FIG. 7.

The terminal applies weightings to the stored sample values at step 1020. The weighting to be applied may be calculated based on various metrics such as Signal-to-Noise Ratio (SNR), Signal-to-Interference Ratio (SIR), and Signal-to-Interference plus Noise Ratio (SINR). For more detail about the weighting application operation, refer to FIG. 8 and the description made with reference to FIG. 8.

The terminal generates a sequence by summing the weighted sample values at a predetermined interval at step 1030. The terminal may sum the weighted samples at an interval of M/B. At this time, B*L sample values are summed. Here, L denotes an overlapping factor, M denotes a number of QAM FBMC symbols, and B denotes a number of filter banks.

The terminal may identify at step 1040 the synchronization information from the sequence. The terminal may determine a correlation metric for the sequence. The terminal may store the correlation metric values. If a plurality of sequences are generated at step 1030, it may be possible to determine, calculate, and identify correlation metric values for the respective sequences. The terminal may use the index of the symbol having the greatest value among the stored correlation metric values to identify the synchronization start point.

Meanwhile, the terminal may acquire part of the system information of the base station in the procedure of identifying the synchronization information. The terminal may identify the index of the filter bank corresponding to the synchronization information. The terminal may identify at least one system information of a physical identifier, a cell group identifier, a TDD/FDD identifier, and a frame identifier, based on the filter bank index.

In an embodiment of the present invention, the synchronization method is limited to the method of FIG. 10 and performed according to the embodiments of FIGS. 1 to 8 and other alternative embodiments modified therefrom.

Figure 11:
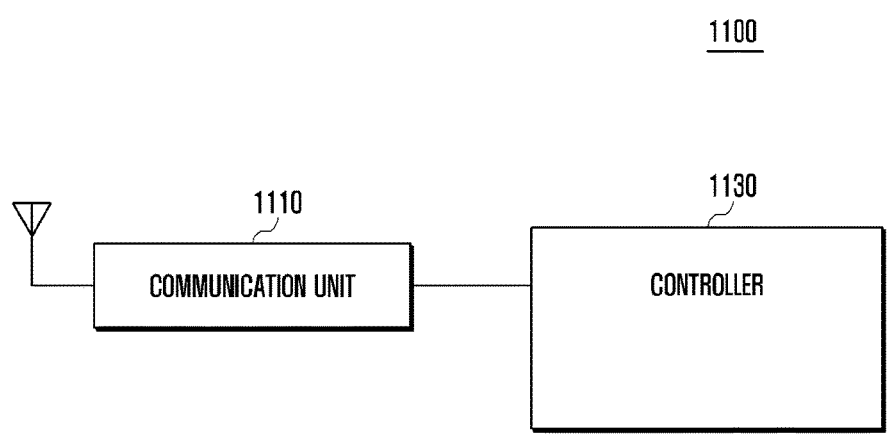
FIG. 11 is a block diagram illustrating a configuration of a base station according to an embodiment of the present invention.

FIG. 11 is a block diagram illustrating a configuration of a base station according to an embodiment of the present invention.

In reference to FIG. 11, the base station 1100 may include a communication unit 1110 for transmitting and receiving signals and a controller 1130 for controlling operations of the base station. The controller may control generating and transmitting a QAM-FBMC symbol containing a synchronization signal according to an embodiment of the present invention.

According to an embodiment of the present invention, the controller 1130 may control to generate a QAM symbol sequence with a length of K for the synchronization signal, map the QAM symbol sequence to a subcarrier of a filter bank based on the correlation characteristic of the synchronization signal, generate a QAM-FBMC symbol containing the synchronization signal based on the mapping result, and transmit the QAM-FBMC symbol.

According to an embodiment of the present invention, in the case of the cross correlation-based synchronization signal, the controller 1130 may control to map the QAM symbol sequence to a subcarrier of a predetermined filter bank among the plural filter banks. In the case of the delay correlation-based synchronization signal, the controller 1130 may control to map the QAM symbol sequence to one of odd-numbered subcarrier groups or even-numbered subcarrier groups of a predetermined filter bank among the plural filter banks. The controller 1130 may also control to map the QAM symbol sequence to one of the map 0 to the subcarriers to which no QAM symbol sequence is mapped in the predetermined filter bank.

According to an embodiment of the present invention, the controller 1130 may control to map the QAM symbol sequence to a subcarrier of a predetermined filter bank, map the QAM symbol sequence for data to other subcarriers of the predetermined filter bank and subcarriers of other filter banks, and transmit the QAM-FBMC symbol containing the synchronization signal and the QAM FBMC symbols containing data in the state of being overlapped.

According to an embodiment of the present invention, the controller 1130 may control to map the QAM symbol sequence in order to identify at least one system information of a physical identifier, a cell group identifier, a TDD/FDD identifier, and a frame identifier, based on the filter bank index.

The operations and functions of the base station 1100 and the controller 1130 are not limited by the operations described with reference to FIG. 11. The base station 1100 and the controller 1130 may perform the operations and functions of the FBMC synchronization symbol transmission device that are described with reference to FIGS. 1 to 8.

Figure 12:
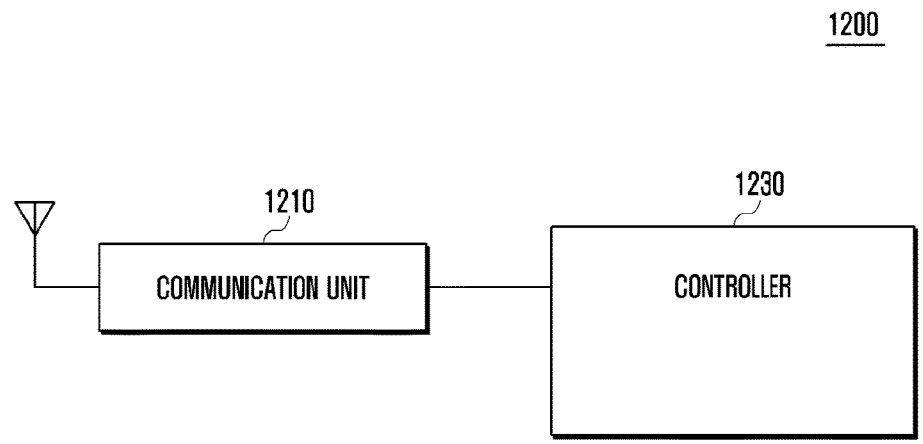
FIG. 12 is a block diagram illustrating a configuration of a terminal according to an embodiment of the present invention.

FIG. 12 is a block diagram illustrating a configuration of a terminal according to an embodiment of the present invention.

In reference to FIG. 12, the terminal 1200 may include a communication unit 1210 for transmitting and receiving signals and a controller 1230 for controlling overall operations of the terminal 1200.

According to an embodiment of the present invention, the controller 1230 controls to store sample values of the QAM-FBMC symbols, apply weightings to the stored sample values, generate a sequence by summing the weighted sample values at a predetermined interval, and identify synchronization information based on the sequence. The sequence may be generated by summing B*L weighted sample values at an interval of M/B. Here, L denotes an overlapping factor, M denotes a number of QAM FBMC symbols, and B denotes a number of filter banks.

According to an embodiment of the present invention, the controller 1230 may control to determine a correlation metric for the sequence and store the determined correlation metric value.

The controller 1230 may also control to identify the synchronization start time based on the largest of the stored correlation metric values. The controller 1230 may control to check the index of the filter bank corresponding to the synchronization information and identify at least one system information of a physical identifier, a cell group identifier, a TDD/FDD identifier, and a frame identifier, based on the filter bank index.

The functions and operations of the terminal 1200 and the controller 1230 are not limited by the operations described with reference to FIG. 12. The terminal 1200 and the controller 1230 may perform the operations and functions of the FBMC synchronization symbol transmission device that are described with reference to FIGS. 1 to 8.

Using the synchronization signal generation method, the corresponding initial reception synchronization method, and the filter bank index-based intrinsic system information acquisition method in the cell identification procedure, it is possible to implement a QAM-FBMC-based cellular network efficiently. In particular, the conventional FBMC synchronization method has drawbacks of inter-data symbol interference in generating a synchronization signal because of the overlap and sum operation required by the nature of FBMC and lack of an efficient synchronization signal configuration scheme because of the increased overhead in comparison with OFDM.

The present invention realizes all the advantages of the legacy OFDM synchronization scheme with the exception of a slight increase of complexity (configuration with only the transmit information independent sequence, periodic 1 symbol, and sub-band type available). In particular, the present invention is advantageous in terms of orthogonality between filter bank resources in spite of an overlap of the synchronization symbol with the neighboring data symbols in the course of the overlap and sum process and RS overhead adjusted to an extent similar to OFDM without degradation of receive synchronization performance.

Since the QAM-FBMC synchronization symbol is transmitted in the original FBMC transmit waveform without modification, as with the data symbol, it is possible to enjoy the advantages of the frequency domain transmit spectrum characteristic (low out-of-band radiation (OOBR)) of the legacy FBMC. Also, the receive synchronization scheme of the present invention is capable of being performed in adaptation of the corresponding synchronization signal regardless of whether the synchronization signal is a preamble type or a sequence-based sub-band type.

Finally, the synchronization methods, with the exception of the method using the characteristic of utilizing two or more filter banks, of the present invention are applicable to all the types of filter bank-based systems adopting the Generalized Nyquist Condition (GNC) filter, e.g., Filtered Multi-Tone (FMT), Generalized Frequency Division Multiplexing (GFDM), and Bi-orthogonal Frequency Division Multiplexing (BFDM).

Although various embodiments of the present disclosure have been described using specific terms, the specification and drawings are to be regarded in an illustrative rather than a restrictive sense in order to help understand the present invention. Thus the scope of the invention should be determined by the appended claims and their legal equivalents rather than the specification, and various alterations and modifications within the definition and scope of the claims are included in the claims.

The invention claimed is:

1. A synchronization signal transmission method of a base station in a Filter Bank Multi-Carrier (FBMC) system, the method comprising:
generating a frequency domain Quadrature Amplitude Modulation (QAM) symbol sequence with a length of K for a synchronization signal, wherein the K is equal to or smaller than a value of M/B;
mapping the QAM symbol sequence to a subcarrier of a filter band based on a correlation characteristic of the synchronization signal;
generating a QAM-FBMC symbol containing the synchronization signal based on the mapping; and
transmitting the QAM-FBMC symbol,
wherein the M is a value of a number of subcarriers of the QAM-FBMC symbol including null subcarriers and the B is a value of a number of base filters.

2. The method of claim 1, wherein mapping the QAM symbol sequence comprises:
mapping, if the synchronization signal is based on cross correlation, the QAM symbol sequence to the subcarrier of a predetermined filter bank among a plurality of filter banks.

3. The method of claim 1, wherein mapping the QAM symbol sequence comprises:
mapping, if the synchronization signal is based on delay correlation, the QAM symbol sequence to one of an odd-numbered subcarrier group and an even-numbered subcarrier group in a predetermined filter bank among a plurality of filter banks; and mapping 0 to subcarriers to which no QAM symbol sequence is mapped in the predetermined filter bank.

4. The method of claim 1, wherein mapping the QAM symbol sequence comprises:
   mapping the QAM symbol sequence to a subcarrier of a predetermined filter bank, and
   mapping QAM symbol sequences for data to remaining subcarriers of the predetermined filter bank or subcarriers of other filter banks,
   wherein transmitting the QAM-FBMC symbol comprises:
      overlapping the QAM-FBMC symbol containing the synchronization signal and QAM-FBMC symbols containing data.

5. The method of claim 1, wherein mapping the QAM symbol sequence comprises:
   mapping the QAM symbol sequence to identify at least one system information of a physical identifier, a cell group identifier, a time division duplex (TDD)/frequency division duplex (FDD) identifier, and a frame identifier based on an index of a filter bank.

6. A base station of a Filter Bank Multi-Carrier (FBMC) system, the base station comprising:
   a transceiver configured to transmit and receive signals; and
   at least one processor configured to:
      generate a frequency domain Quadrature Amplitude Modulation (QAM) symbol sequence with a length of K for a synchronization signal, wherein the K is equal to or smaller than a value of M/B,
      map the QAM symbol sequence to a subcarrier of a filter band based on a correlation characteristic of the synchronization signal,
      generate a QAM-FBMC symbol containing the synchronization signal based on the mapping, and
      transmit the QAM-FBMC symbol,
      wherein the M is a value of a number of subcarriers of the QAM-FBMC symbol including null subcarriers and the B is a value of a number of base filters.

7. The base station of claim 6, wherein the at least one processor is further configured to map, if the synchronization signal is based on cross correlation, the QAM symbol sequence to the subcarrier of a predetermined filter bank among a plurality of filter banks.

8. The base station of claim 6, wherein the at least one processor is further configured to:
   map, if the synchronization signal is based on delay correlation, the QAM symbol sequence to one of an odd-numbered subcarrier group and an even-numbered subcarrier group in a predetermined filter bank among a plurality of filter banks, and
   map 0 to subcarriers to which no QAM symbol sequence is mapped in the predetermined filter bank.

9. The base station of claim 6, wherein the at least one processor is further configured to:
   map the QAM symbol sequence to a subcarrier of a predetermined filter bank,
   map QAM symbol sequences for data to remaining subcarriers of the predetermined filter bank or subcarriers of other filter banks,
   overlap the QAM-FBMC symbol containing the synchronization signal and QAM-FBMC symbols containing data, and
   transmit the overlapped QAM-FBMC symbol.

10. The base station of claim 6, wherein the at least one processor is further configured to map the QAM symbol sequence to identify at least one system information of a physical identifier, a cell group identifier, a time division duplex (TDD)/frequency division duplex (FDD) identifier, and a frame identifier based on an index of a filter bank.

* * * * *